CHARACTER SEPARATING READING MACHINE

Filed March 5, 1963 2 Sheets-Sheet 1

INVENTOR
Arthur W. Holt
BY Joseph A. Genovese & Max L. Libman
ATTORNEYS

INVENTOR
Arthur W. Holt
BY Joseph A. Genovese & Max L. Libman
ATTORNEYS

United States Patent Office 3,303,466
Patented Feb. 7, 1967

3,303,466

CHARACTER SEPARATING READING MACHINE

Arthur W. Holt, Silver Spring, Md., assignor, by mesne assignments, to Control Data Corporation, Minneapolis, Minn., a corporation of Minnesota Filed Mar. 5, 1963, Ser. No. 263,020
3 Claims. (Cl. 340—146.3)

Figures 1, 1A, 1B, 1C, 3:
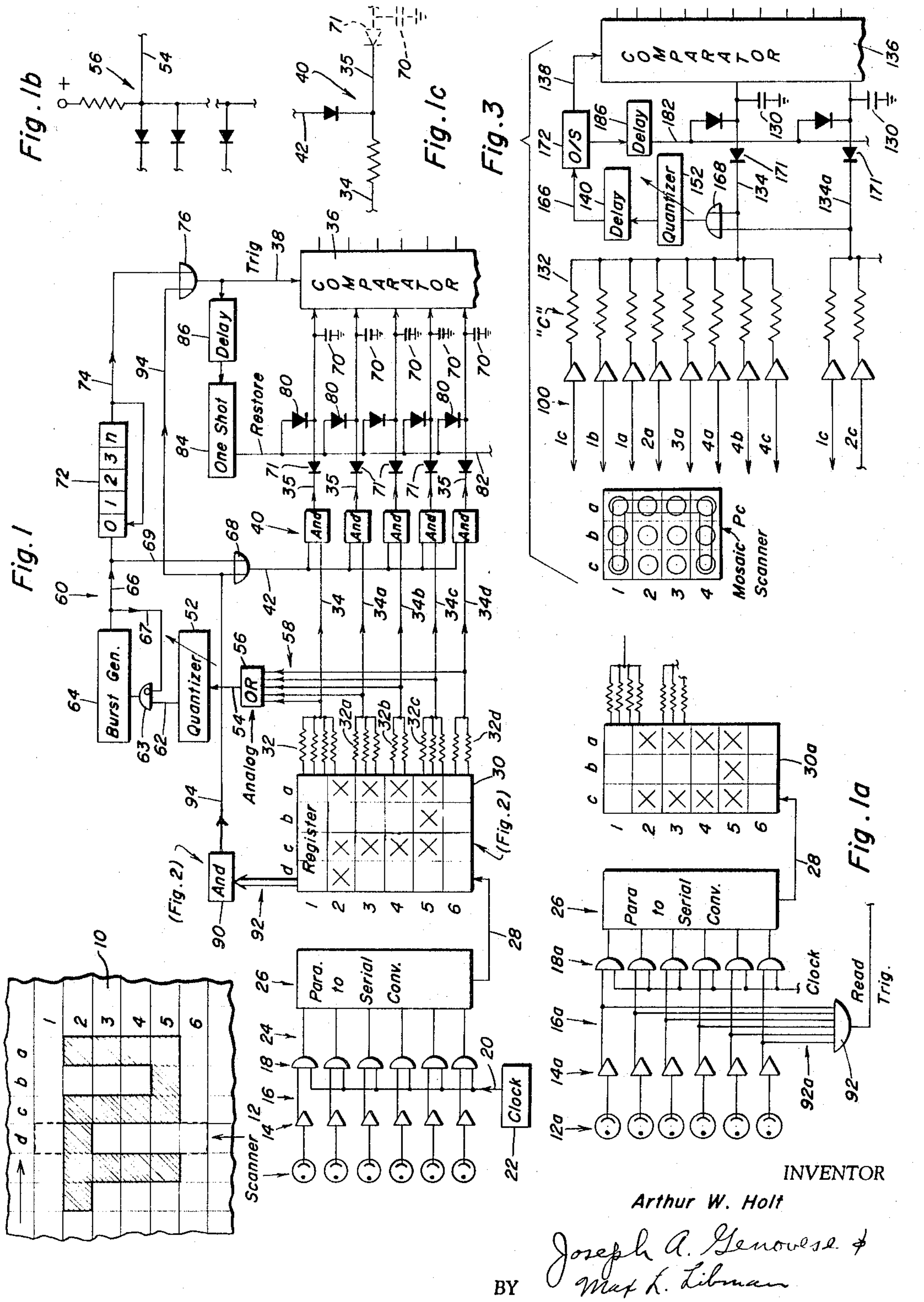

This invention relates to reading machines and particularly to machines to identify characters of ordinary print, where some of the adjacent characters touch, and/or where there is dirt in the area of the characters.

Most reading machines have a scanner, a scan-output processor network, and a decision section made of a comparator for the output signals of the processor network. In the majority of machines the processor network includes a memory (usually a shift register but sometimes capacitors as in the J. Rabinow Patent No. 2,933,246 and No. 3,201,751), for temporary storage (and/or other reasons) of the scanner-extracted data, which ultimately reaches the comparator in one form or another, e.g. as correlation signals. Correlation signals represent the degree of match of an unknown character with pre-wired criteria pertaining to the characters which the machine is expected to identify. Further details of a reading machine constructed along these lines can be found in Patent No. 3,104,369.

Reading machines have a problem in knowing exactly when to trigger the comparator to make the character-identity decision, i.e. as the scanner outputs (also called scan data herein) gated into the register move into registration with the correlation devices, to trigger the comparator at exactly the correct instant. The problem is not easily solved with prior systems because they rely directly or indirectly on font limitations of quality of print of the characters on the document.

In many instances "read" trigger signals are based on real time (e.g. as in Patent No. 3,104,369) as follows. The "horizontal" speed of the document is known and as soon as the scanner "sees" a part of a character, a timing cycle starts which is responsible for loading the register with a specific number of "vertical" scans of scan data pertaining to the character area. Then the comparator is triggered to "read," that is compare correlation signals derived from the data in the register at the end of the timing cycle. This system is not wholly satisfactory because it is sensitive to stretch of the paper, variations of speed of the document mover; it presupposes that all characters will be of the same width (thus is restricted to special fonts); and it indirectly relies on the clear space to provide a "read" trigger as follows: the clear space between characters is required to start the above timing cycle (to load the register), and the "read" trigger occurs only at the end of the timing cycle.

Other machines rely directly on the clear space (usually "white") between printed characters to provide a "read" trigger signal. In other words, the register is loaded until the scanner "sees" the separation between characters and this is used to provide the "read" trigger. This system fails when characters are so printed that a scan line cannot pass between them, for instance when they overlap or touch. An analogous failure is experienced in the real time system using a fixed number of scans and then a trigger, as discussed above.

Machines have been proposed using a serial shift register and a continuous input from the scanner. Thus, the character-defining data and space between characters will be gated into the serial registers, and sooner or later the character-defining data will be registered with the correlation devices. But even such a machine must know when to trigger the comparator, and before my invention the use of the clear space between characters for this purpose is the only method that, to my knowledge, has been suggested.

An object of this invention is to provide a system for determining when to trigger the comparator (or the equivalent) of a reading machine, by examining the correlation signals of the machine for a predetermined correlation (below the optimum possible), at which a storage program is started whereby the best correlation signals of several successive sets of signals are stored, and at the end of the program the "read" trigger signal is provided. In essence, as the character-data moves through (or into) the register and the degree of match with one (or more) criteria becomes reasonably good, a program is commenced wherein the correlation signals for each possible character (each that the machine can identify) are stored. The storage step is repeated an arbitrarily selected number of times, e.g. in step with the register for two, three, twenty, thirty, etc. register steps. While this is happening, the storage devices record the best correlation signal pertaining to each of the characters and then the "read" trigger is applied to the comparator and the character-identity decision is made on the basis of the best stored signal.

It is to be noted that the invention does not rely on the clear space between characters (thus the printed characters can be touching), nor does it rely wholly on real time as in the systems using a fixed number of scans per character. The concept of the invention is to look for a threshold matching condition which is construed by my circuits to mean that the unknown character (i.e. signals derived from the scan-data) is moving into a matching position and thereafter the correlation signals for the next few or more steps of the register are stored. Then the comparator is triggered whether or not there is a clear space between characters. Thus, the "read" trigger signal is independent of a space between characters and character width.

Another object of the invention is to provide a reading machine with means for gating on its comparator at a time when the character-defining scan data has been extracted from the character area, regardless of the width of the character, the motion of the document containing the character area and independently of the presence or absence of the space between adjacent characters on the character area.

A further object of the invention is to provide a storage program (in addition to the conventional storage register function of the reading machine) by which storage devices, e.g. capacitors, record the best character-correlation signals of successive sets after the program is started, whereby the best correlation signals for a plurality of scan-data positions are available to the comparator at the time of comparator actuation.

Another object of the invention is to provide means to start the above program after the scan-data has begun to move into proper position for recognition but before it has reached the proper position thereby enabling the program to be operative for a selected number of register steps and then provide a comparator trigger which will, with a high degree of certainty, by given at the proper time.

The problem of dirt on the document is formidable. In most cases dirt is random, making it particularly difficult for the machine to ignore. In machines which rely on the detection of "black" in one or a few adjacent vertical scans to start a register loading and/or recognition cycle (as in Patent No. 3,104,369) there is a particularly grave problem, especially when the dirt is large as made by tramp metal on or between printing plates. To the machine several adjacent scans will "see" black and this will start the register loading or recognition cycles. Once started the dirt is treated as a character and the machine will either call the dirt a character (usually one of the symbols) or reject the dirt but only after the full recognition cycle is completed. This increases the reject rate of the machine and spoils the output record (punched cards, tape, magnetic tape, etc.).

It is apparent that my invention automatically overcomes this difficulty because the storage program is not started until at least one correlation signal reaches a level at which one can be certain that a character is being examined and not dirt. This is an inherent advantage of requiring a reasonable degree of correlation (rather than looking for adjacent scans to contain "black" bits) before committing the machine to a recognition cycle.

Other objects and features of importance will become apparent in following the description of the illustrated forms of the invention which are given by way of example only.

FIGURE 1 is a diagrammatic view showing one form of my invention.

FIGURE 1*a* is a fragmentary diagrammatic view showing that it is not necessary to have a register any wider than the character scan area.

FIGURE 1*b* is a view showing an analog OR gate.

FIGURE 1*c* is a view showing an analog AND gate which is enabled by digital pulses.

Figures 2, 2A:
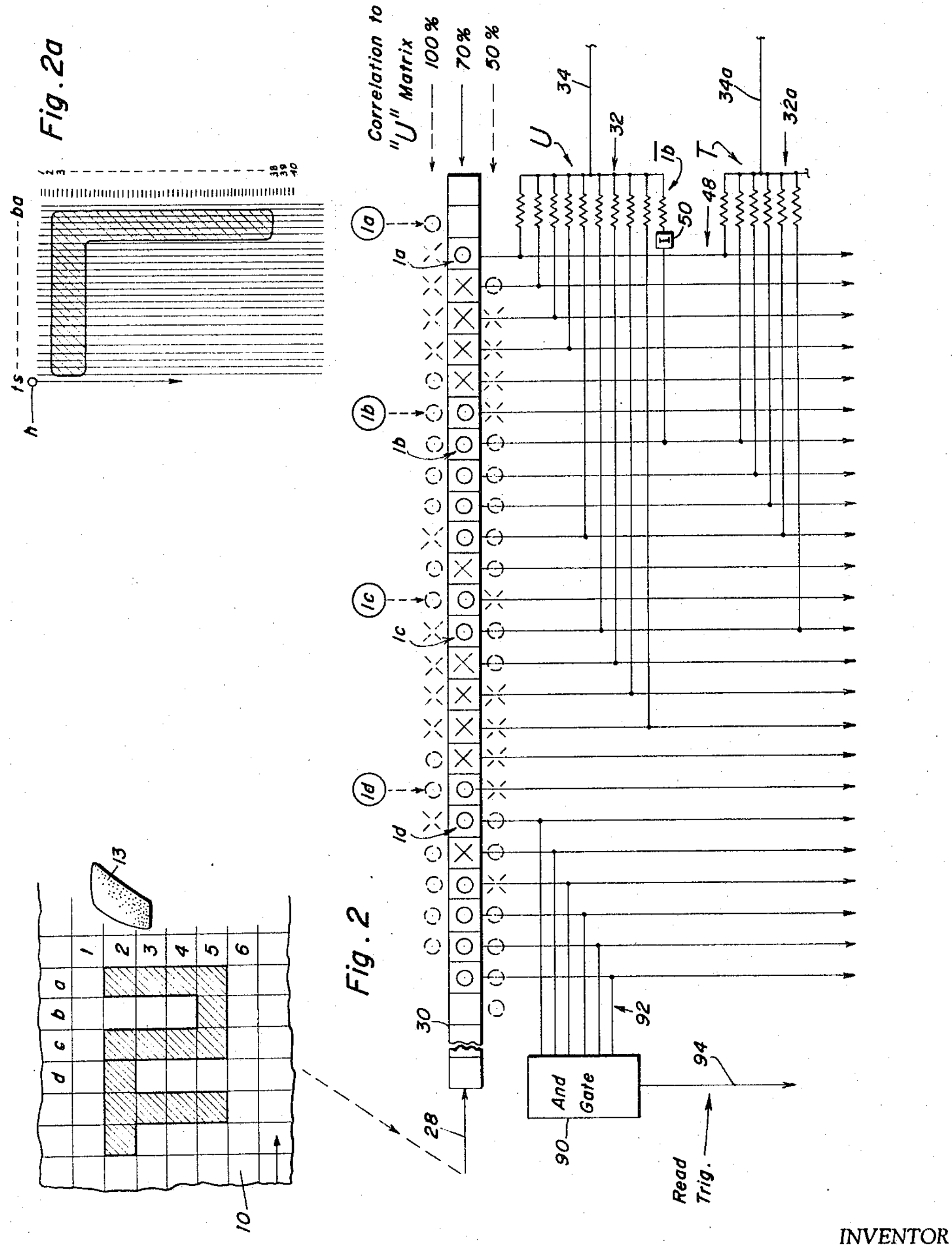

FIGURE 2 is a diagrammatic view showing details of the serial register of FIGURES 1 and 1*a*.

FIGURE 2*a* is a schematic view showing the traces of a scanning disc aperture over a character area, and the sample points along each scan line, this view depicting more or less actual resolution for an area correlation reading machine.

FIGURE 3 is a schematic view showing a simplified embodiment applied to an analog reading machine.

FIGURE 1 shows a document 10 where the characters T and U are printed in a three-by-four font. Scanner 12 is assumed to be stationary as the document moves to the right, and the scanner is composed of a vertical row of photocells. There are six photocells and their outputs are gated four times at *a, b, c* and *d* in time with the motion of document 10. Thus, the total area containing the character U has twenty-four subareas. Information is extracted from each of the subareas. In practice, there will be many more photocells and considerably more than scans *a, b, c, d,* which is another way of stating that for area correlation machines the resolution must be considerably higher (e.g. the area will be subdivided into 400 or more subareas as is shown in FIGURE 2*a* where scan disc hole *h* covers the area with twenty vertical scan lines *a* through *t* and there are forty samples 1–40 clock pulses during each scan line). However, the coarse examination using photocell scanner 12 (FIGURE 1) illustrates the principal and materially simplifies the drawings.

The individual photocells of scanner 12 are connected to amplifiers 14 whose output lines 16 form one input of a group of two-entry AND gates 18, the other input of which is conducted over line 20 from a clock pulse generator 22. The timing of clock pulse generator 22 is correlated with the motion of document 10 in a manner that clock pulses occur when the document is beneath scanner 12 at *a, b, c,* and *d* respectively. Thus, the bits of information corresponding to "black" and "white" of the various subareas of the scan-field (areas examined by scanner 12) are conducted column-by-column over lines 24 to a conventional parallel-to-serial converter 26. (Where the scan data is extracted serially, e.g. when an apertured scanning disc is used as in FIGURE 2*a*, converter 26 is omitted.) For simplicity it can be assumed that amplifiers 14 quantize the photocell outputs to digital signals of −6 volts and +6 volts respectively representing black and white in the examined subareas. However, my invention can be used equally well with analog reading machines which do not quantize the information signals.

Returning to FIGURE 1, after the bits in each column (scan line) are gated into converter 26, a serial pulse train of the bits is conducted from converter 26 on line 28 to be gated into register 30. As described later the operation of my invention does not require a register in the machine, but if the machine has a register it is preferably a serial register 30. FIGURE 1 shows register 30 of a capacity to store four vertical scans *a, b, c* and *d*. However, a comparison of the registers 30 (FIGURE 1) and **30*a*** (FIGURE 1*a*) shows that it is not necessary to store four vertical scans when the character is only three units wide. In practice, register **30*a* may be of a capacity capable of storing only the tallest and widest expected character. The wider register 30** of FIGURE 1 can be used with my invention and therefore it is illustrated. Furthermore, a wider register permits additional logic procedures and visually demonstrates the character-touching problem.

As in Patent No. 3,104,369, an area correlation reading machine can use resister adders or matrices 32, **32*a*, 32*b*, etc. for the correlation devices. My invention is not limited to a correlation machine, but that type machine is used to illustrate my invention. In an area correlation, reading machine there is at least one resistor adder to establish the "electronic mask" or character-criterion for each possible character to which the information stored in register 30 is compared to provide correlation signals on output lines 34, 34*a*, 34*b*, etc. The signals conducted on lines 34, 34*a*, etc. have values corresponding to the degree of match of the stored information in register 30 with the criteria formed by the specific connection points of the resistors of the adders and the selected points of register 30**. This is exactly analogous to a machine such as disclosed in Patent No. 3,201,751 where there is no register, and correlation takes place as an unknown character image sweeps over a mosaic of photocells whose outputs are fed to resistor adders. Instead of a register the correlation signals from the adders are stored in a memory composed of capacitors. This is described in more detail in connection with FIGURE 3. For now attention is returned to FIGURES 1 and 2.

In an optical reading machine such as disclosed in Patent No. 3,104,369 lines 34, **34*a*, etc. would be connected as inputs to comparator 36 which is the major part of the decision section of the reading machine. The purpose of comparator 36 is to select the "best" comparison or correlation signal (most negative, most positive, etc.) applied to it by way of lines 34, 34*a*, etc., and provide an output signal, code, etc. identifying the character. However, comparator 36 does not operate until there is an enabling control or trigger signal on line 38. Comparator 36 is conventional, e.g. it can be identical to the comparator disclosed in Patent No. 3,104,369, and it is at this point that my invention substantially differs from that patent. Instead of the direct connection of correlation signal lines 34, 34*a*, etc. with comparator 36, I have interposed a set of AND gates 40 in lines 34, 34*a*, etc. in a manner that these lines form a single input of each of the gates 40, and lines 35 conduct the output signals from the gates. Thus, the correlation signals do not pass gates 40 until the gates are opened by means of an enabling pulse on line 42** which is described later.

At present, attention is directed to FIGURE 2 where serial register 30 is reproduced in an in-line arrangement. The output line 28 of converter 26 conducts the scanner-extracted bits into serial shift register 30 in time with the horizontal motion of document 10, as described with reference to FIGURE 1. The data stored in register 30 (FIGURE 2) has been extracted from all of the subareas *a*–1 through *d*–6 with the zeros representing "white" bits and the *x*'s representing "black" bits.

Correlation device 32 is shown with the correct points of connection for the character U, to a group of buses 48 attached to the individual elements (for instance flip flops or magnetic cores) of shift register 30. When connected in the manner shown, data extracted from the letter U will provide an optimum signal at the time that the bits reach a predetermined position as they step through the register. Correlation device 32a shows the correct connection points for the letter T, and in a like manner correlation devices for all of the unknown characters to be read (not shown) are connected with buses 48. Further, more than one resistor matrix (correlation device) can be used for the same character but in slightly displaced positions in a manner similar to that disclosed in Patent No. 3,104,369.

Considering the U example, correlation device 32 has ten connection points with ten different buses 48. Nine of them are designed to "seek" the "black" points 2–a through 5–a, 5–b and 2–c through 5–c indicated on the grid hypothetically superimposed on document 10. The lowermost resistor of device 32 is connected at a point in register 30 which corresponds to points 2b which is a "white-expected" point for the letter U. However, there is an inverter 50 interposed in the resistor matrix for this line so that a "black" signal-equivalent is "seen" by the resistor matrix when in fact point 2b on the hypothetical grid of document 10 is "white." This is to distinguish between the O and U which may be otherwise indistinguishable if they completely superimpose. The use of inverter 50 and the technique for distinguishing between characters and sub-sets thereof is the assertion and negation technique described in Patent No. 3,104,369.

As a result of scanning the character area, register 30 (FIGURE 2) is loaded by way of line 28 and it is assumed that lower line of information bits (shown dotted beneath register 30) are loaded in the position illustrated immediately below the register. Following the connections between matrix 32, buses 48 and connection points to register 30, it is seen that five of the ten points of adder 32 are satisfied. Thus correlation device 32 is matched by the stored information in a manner that there is a 50 percent correlation. When the register 30 steps one more stage (shown by the zeros and x's within register 30) 70 percent correlation with matrix 32 exists. When the information is progressed one step further in register 30 (shown by the bits in dotted lines above register 30 in FIGURE 2) there is a 100 percent correlation between the data stored in register 30 and the resistor adder 32. The 50 percent, 70 percent and 100 percent correlation values are obtainable notwithstanding the touching of the two characters T and U on document 10, as the "black" information bit at 2d is considerably to the left of the connection points between the correlation devices and the portions of the register 30 which are used in identifying the unknown character U. Accordingly it is evident that the unknown character can be identified even though it touches an adjacent unknown character on the document if one does not rely upon the existence of a clear white space between adjacent characters to provide the trigger signal (on line 38) for comparator 36 (FIGURE 1). I do not necessarily rely on the clear white space as described below.

When information steps through register 30 the correlation signals on lines 34, 34a, etc. will change, some going up and some going down depending on the instantaneous degree of match between the correlation devices and the data in the register, and of equal importance, its position in the register. Therefore I have detecting means to continually examine the correlation signals on the individual lines 34, 34a, etc., for instance, a quantizer 52. A quantizer is selected because it provides a digital output pulse and fires when a threshold is reached. The threshold level can be adjustable as symbolically shown by the arrow in FIGURE 1. The continued examination of the correlation signals on lines 34, 34a, etc., is accomplished by the quantizer whose input on line 54 is the output of an analog OR gate 56 whose details are shown in FIGURE 1b. The inputs to the analog OR gate are by way of lines 58 which are connected to the individual correlation signal lines 34.

Quantizer 52 constitutes a part of a program means 60 which provides a program cycle upon the above threshold correlation, as follows: the output signal from quantizer 52 is a control signal conducted on line 62 through inhibit gate 63 to trigger a pulse burst generator 64. The output pulses of generator 64 on line 66 are fed back over line 67 to the inhibit terminal of gate 63 so that the burst generator cannot be recycled by quantizer 52 while the generator 64 is operating. The generator output pulses on line 66 are conducted to the OR gate by way of line 69 connected to line 66. Gate 68 has the previously mentioned line 42 as its output, and as indicated before, the pulses conducted on line 42 open gates 40 (details shown in FIGURE 1c) to allow the analog correlation signals (as at the time of the gate 40-enabling pulses) to pass and be conducted on lines 35. Storage devices, for instance peak detectors made of capacitors 70 and peak detector diodes 71 (FIGURES 1 and 1c) are connected with lines 35 to record or store peak correlation signals at the time that gates 40 are open. While this is happening the pulses from burst generator 64 are used to step ring counter 72 one stage for each of the control pulses. When the counter 72 (which may have any number of stages) has stepped to the end, the last stage provides an output pulse on line 74 which passes through OR gate 76 whose output is the previously mentioned comparator-trigger signal on line 38. Thus, if counter 72 has ten stages (or is adjusted or preset to be reset after ten input pulses) the correlation signals on lines 34, 34a, etc., are sampled ten times and after the tenth sampling, comparator 36 is triggered "on" to make the character-identity decision on the basis of the correlation signals stored in capacitors 70. The peak detector capacitors 70 are considered better means to record the correlation signals than digital devices or magnetic recorders because they automatically store the "best" voltage. For instance, if the most negative voltage is considered "best" a given capacitor (in a hypothetical case) may store a peak of two volts at the first sample, four volts during the second sample and be exposed to three volts peak correlation signal in the third sample. The second sampled signal being more negative than the first, will be stored. The third sample being more positive than the stored −4 volts, will not effect the stored 4 volts, whereby the capacitor will automatically store the "best" (−4 volts) correlation signal to make it available for character-identity by means of comparator 36. In another example (FIGURE 2), a voltage corresponding to 50 percent correlation to any one of the matrices (as shown in FIGURE 2 for the character U) is used as the threshold for operating quantizer 52. Thus for the conditions depicted in FIGURE 2, the first sampling of the correlation signal from correlation device 32 will provide a rather low signal (50% correlation), the second sampling a better signal (70% correlation), and the third sampling the best signal (100% correlation) that can be expected for the unknown character U.

After the unknown character is identified by actuation of comparator 36, it is necessary to restore all of the capacitors 70 to an initial state which can be zero volts, ground level, etc. This can be accomplished by conventional means, as follows. Keeping with the example that the most negative is the "best" signal, I have diodes 80 connected to lines 35 and to a restore line 82 which conducts a strong signal of a polarity opposite to that stored in capacitors 70. One shot multivibrator 84 can be used as the signal generator, it being triggered by a signal conducted from trigger line 38 through a delay 86 of sufficient duration to allow comparator 36 to function before the one shot fires. The lower end of restore line 82 is shown broken because it is to be understood that I have shown a capacity for recognizing only four characters in FIGURE 1 and obviously for a practical application there will be more correlation devices 32, gates 40, capacitors 70, etc., to identify numerals, symbols and/or letters of the alphabet.

When my invention is applied to an analog machine, e.g. as in Patent No. 3,201,751, it can be somewhat simplified as shown in FIGURE 3 herein. This figure shows a scanner made of the mosaic of photocells, and the image of the unknown character is swept across the mosaic. Lines 100 attached to the resistors of adder 132, have legends corresponding to the photocells with which they are connected for the letter C. It is understood that the connections between the other adders (not shown) and the photocells are made in accordance with the shape of the character represented by the resister adders. The output lines 134, 134*a*, etc. from the adders are connected as inputs to comparator 136, and the reading machine disclosed in Patent No. 3,201,751 (after which FIGURE 3 is patterned) has no shift register. Instead capacitors 130 are used as the memory of the machine by storing the correlation signals on lines 134, 134*a*, etc. as the character sweeps across the photocell mosaic. Then, when column C "sees" all "white" a read trigger for comparator 136 is provided.

Applying my invention to this machine is considerably simpler than described in connection with FIGURE 1. First of all, capacitors 130 suitable for my purpose are already in the machine, and I need not add additional capacitors as at 70 in FIGURE 1. The only additional components required are peak detector diodes 171. Burst generator 64 and the burst counter 72 can be substituted by a delay 140 having a predetermined duration. This embodiment of my invention can be constructed as follows:

OR gate 168 has input lines 158 connected to the individual correlation signal lines 134, 134*a*, etc. The OR gate output line is connected to quantizer 152 which is the same as quantizer 52 of FIGURE 1. When the quantizer fires, the output control signal on line 166 is delayed at 140 long enough for the moving character image to register with the mosaic scanner. Then the delayed signal on line 166 operates a one shot multivibrator 172 whose signal on line 138 triggers the comparator. The one shot signal is also conducted on restore line having a small delay 186 to make certain that the comparator has actuated before capacitors 130 are prepared to accept correlation signals from another examined character. Thus, the program initiated by the firing of quantizer is considerably simpler than the program in the embodiment of FIGURE 1.

As explained before, reading machines often seek the clear white space between characters to develop a signal indicating the end of a character and/or for providing a trigger signal to actuate the comparator. I can use this system in combination with mine. Thus, AND gate 90 has input lines 92 (FIGURE 2) connected to the buses 48 which corresponds to column *d* of the grid superimposed on document 10. The output line 94 of AND gate 90 (FIGURE 1) is connected with OR gates 68 and 76 to both open gates 40 and provide the "read" trigger on line 38. Thus, my system can be used with the clear white space-seeking system. When it is desired to maintain register size at a minimum (FIGURE 1*a*) lines 92*a* can be connected with lines 16*b* i.e. the conductors of the quantized outputs from amplifiers 14*b* of the photocell scanner. The same information is as in register 30 available on lines 16*b*. It is apparent that when no clear white space exists between characters, a system which relies on this space to note the beginning or end of a character will fail. This is shown in FIGURE 2 where the "black" bit in the left part of register 30 will prevent AND gate 90 from operating to provide the necessary "read" trigger signal in each of the three shifted positions of information in register 30.

I mentioned the ever-present problem of dirt which is more serious in some machines than in others. For example an optical mask reading machine as in the Rabinow Patent No. 2,933,246 is practically insensitive to dirt on the document. But in machines where an entire area is examined, a machine usually cannot distinguish between random dirt and a character. This is especially grave when the dirt is large, as at 13 in FIGURE 2, and the reading machine relies upon "black" bits in a few adjacent scans to start the register-loading cycle and/or the read trigger timing cycle. The machine has no alternative but to consider that the dirt 13 is a character and reject it thereby spoiling the output record from the machine.

With my invention, dirt (e.g. as at 13) is automatically ignored because my program means 60 do not start until at least one correlation signal reaches a reasonable level, e.g. 50 percent as suggested before. In the vast majority of cases random dirt will not 50 percent correlate with any character matrix 32. And if dirt does correlate that well with a matrix 32, the chances are that the "dirt" is really a very poorly printed part of a character.

The preceeding description is given by way of example only and is not intended to represent a disclosure of the only ways to practice the invention. For example, burst generator 64 can be synchronized with (or replaced by) the clock generator 22. Further, burst generator 64 can be synchronous or asynchronous with respect to the loading of register 30 (ultimate result of clock pulses on line 20). It is specifically contemplated that sampling and recording of the correlation signals on lines 34, 35 need not be once per loading cycle of register 30 (in time with the clock pulses on line 20) but may be at the time of every two, three or more loading cycles or a program thereof such as in time with the first, second, seventh, eighth, thirteenth, fourteenth, etc. Further, quantizers 52 and 152 can have their thresholds manually adjusted to require a greater or smaller correlation before operating. The adjustment feature can be omitted, but it enables the program cycle (as in FIGURE 1 or FIGURE 3) to be initiated at the proper time. This, in turn, can be effected by the optical density of the characters on the document especially in an analog machine (FIGURE 3). Obviously, then, the quantizers can be automatically adjusted in accordance with the optical density of the characters to be (or being) identified. Therefore, variations falling within the scope and comprehension of the following claims may be resorted to without departing from the protection thereof.

I claim:

1. In an optical reading machine for characters on a contrasting background, a scanner including a set of photocells to scan a character and its background and provide information outputs corresponding to the character and its background, a processor network responsive to said outputs to provide a set of correlation signals corresponding to the degree of match between the character being scanned and preset character criteria, and a trigger-signal actuated decision means for identifying the character on the basis of said correlation signals; the improvement comprising means to examine sets of said correlation signals and to provide a control signal in response to the attainment of a predetermined value by any correlation signal in a set, means responsive to said control signal to initiate a routine of storing the optimum correlation signals of successive sets of correlation signals and thereafter to provide a first trigger signal for said decision means, detecting means responsive to said information outputs for providing a second trigger signal in response to detection of information outputs corresponding to a clear background space alongside of the character, means for gating said first and said second trigger signals to select one of said first or second trigger signals for triggering said decision means, and means for conducting said selected trigger signal to said decision means.

2. In a reading machine for characters on an area, scanning means including a set of photocells for examining said area and for providing outputs corresponding to the optical densities of the examined portions of said area, means establishing character criteria for the characters which the machine is expected to identify, means responsive to said outputs to provide output signals, means for comparing said output signals with said character criteria to provide comparison signals, conductors connected with said criteria to conduct said comparison signals therefrom, said comparison signals varying in accordance with comparisons of the character being scanned with said criteria, storage devices to store the signals conducted on said conductors, and trigger-actuator decision means responsive to said stored signals for identifying the scanned character; an improvement comprising detection means for examining the comparison signals on said conductors for a comparison signal of a predetermined threshold value, program means responsive to the detection by said detection means of a comparison signal of said threshold value to provide a first control signal capable of functioning as a trigger signal for said decision means, means for delaying said first control signal for a predetermined duration so that the delay of said first control signal provides time after said threshold signal for the character being examined to undergo a predetermined further examination before said decision means are triggered, a second means for providing a second control signal, and logic means to process said control signals in a manner such that if a second control signal is provided during the delay of said first control signal said second control signal is conducted to trigger said decision means.

3. The subject matter of claim 2 wherein said second means include an electrical circuit responsive to the detection of a clear space adjacent to the character for providing said second signal, and said logic means include a gate circuit.

References Cited by the Examiner

UNITED STATES PATENTS

| | | | |
|---|---|---|---|
| 2,932,006 | 4/1960 | Glauberman | 340—146.3 |
| 2,978,675 | 4/1961 | Highleyman | 340—146.3 |
| 3,025,495 | 3/1962 | Endres | 340—146.3 |
| 3,069,079 | 12/1962 | Steinbuch | 340—146.3 |
| 3,081,444 | 3/1963 | Dietrich | 340—146.3 |
| 3,102,995 | 9/1963 | Abbott et al. | 340—146.3 |
| 3,104,369 | 9/1963 | Rabinow et al. | 340—146.3 |
| 3,105,956 | 10/1963 | Greanias et al. | 340—146.3 |
| 3,246,296 | 4/1966 | Heizer et al. | 340—146.3 |

MAYNARD R. WILBUR, *Primary Examiner.*

MALCOLM A. MORRISON, *Examiner.*

J. E. SMITH, *Assistant Examiner.*